United States Patent
Kikuchi et al.

(10) Patent No.: US 10,218,283 B2
(45) Date of Patent: Feb. 26, 2019

(54) INSULATED SYNCHRONOUS RECTIFICATION DC/DC CONVERTER

(71) Applicant: ROHM CO., LTD., Ukyo-Ku, Kyoto (JP)

(72) Inventors: Hiroki Kikuchi, Kyoto (JP); Ryo Shimizu, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 14/980,508

(22) Filed: Dec. 28, 2015

(65) Prior Publication Data
US 2016/0190942 A1 Jun. 30, 2016

(30) Foreign Application Priority Data
Dec. 24, 2014 (JP) ................. 2014-261112

(51) Int. Cl.
*H02M 3/335* (2006.01)
*H02M 1/00* (2006.01)

(52) U.S. Cl.
CPC ... *H02M 3/33576* (2013.01); *H02M 3/33507* (2013.01); *H02M 3/33592* (2013.01); *H02M 2001/0054* (2013.01); *Y02B 70/1475* (2013.01); *Y02B 70/1491* (2013.01)

(58) Field of Classification Search
CPC ......... H02M 3/33507; H02M 3/33592; H02M 3/33523
USPC ........ 363/21.12, 21.13, 21.14–21.18, 95–99, 363/127
See application file for complete search history.

(56) References Cited

U.S. PATENT DOCUMENTS

| | | | | |
|---|---|---|---|---|
| 5,757,627 A * | 5/1998 | Faulk | ................ | H02M 3/33576 363/21.14 |
| 6,191,965 B1 | 2/2001 | Matsumoto | | |
| 7,385,832 B2 * | 6/2008 | Allinder | ............ | H02M 3/33592 363/127 |
| 7,440,298 B2 * | 10/2008 | Yang | ................ | H02M 3/33592 363/127 |

(Continued)

FOREIGN PATENT DOCUMENTS

| | | |
|---|---|---|
| JP | 2009284667 A | 12/2009 |
| JP | 2010074959 A | 4/2010 |
| JP | 2013150456 A | 8/2013 |

OTHER PUBLICATIONS

U.S. Non Final Office Action corresponding to U.S. Appl. No. 14/965,245, dated Dec. 30, 2016.

(Continued)

*Primary Examiner* — Nguyen Tran
(74) *Attorney, Agent, or Firm* — Cantor Colburn LLP

(57) ABSTRACT

When a pulse generator detects that a switching transistor on a primary side of a DC/DC converter turns off, the pulse generator sets a pulse signal S1 to an on level configured as an instruction to turn on a synchronous rectification transistor. When the pulse generator detects that the current that flows through the secondary winding of a transformer becomes substantially zero, the pulse generator sets the pulse signal S1 to an off level configured as an instruction to turn off the synchronous rectification transistor. After a predetermined time-up period elapses after the detection of the turn-on of the switching transistor, a forced turn-off circuit forcibly turns off the synchronous rectification transistor.

21 Claims, 14 Drawing Sheets

(56) References Cited

U.S. PATENT DOCUMENTS

| | | | |
|---|---|---|---|
| 9,001,532 B2* | 4/2015 | Olivik | H02M 3/33592 363/21.14 |
| 2006/0018135 A1* | 1/2006 | Yang | H02M 3/33592 363/21.14 |
| 2009/0091960 A1 | 4/2009 | Yang | |
| 2010/0164456 A1 | 7/2010 | Oyama | |
| 2014/0003096 A1* | 1/2014 | Deng | H02M 3/33592 363/21.14 |
| 2014/0003097 A1 | 1/2014 | Sakurai | |
| 2014/0078788 A1* | 3/2014 | Yao | H02M 3/33592 363/21.14 |
| 2014/0192565 A1* | 7/2014 | Wang | H02M 3/33592 363/21.14 |
| 2014/0268914 A1* | 9/2014 | Wang | H02M 3/33592 363/21.13 |

OTHER PUBLICATIONS

JPO Notification of Reasons for Refusal corresponding to JP Application No. 2014-255548; dated Sep. 11, 2018.
JPO Notification of Reasons for Refusal corresponding to JP Application No. 2014-261112; dated Jul. 24, 2018.

* cited by examiner

INSULATED SYNCHRONOUS RECTIFICATION DC/DC CONVERTER

CROSS-REFERENCE TO RELATED APPLICATIONS

This application is based upon and claims the benefit of priority from the prior Japanese Patent Application No. 2014-261112, filed Dec. 24, 2014, the entire contents of which are incorporated herein by reference.

BACKGROUND OF THE INVENTION

Field of the Invention

The present invention relates to an insulated synchronous rectification DC/DC converter.

Description of the Related Art

Various kinds of consumer electronics devices such as TVs, refrigerators, etc., each operate receiving commercial AC electric power from an external circuit. Also, electronic devices such as laptop computers, cellular phone terminals, and tablet PCs are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (AC/DC converter) that performs AC/DC conversion of commercial AC voltage. Alternatively, in some cases, such an AC/DC converter is built into an external power supply adapter (AC adapter) for such an electronic device.

FIG. 1 is a block diagram showing an AC/DC converter 100r investigated by the present inventor. The AC/DC converter 100r mainly includes a filter 102, a rectifier circuit 104, a smoothing capacitor 106, and a DC/DC converter 200r.

The commercial AC voltage $V_{AC}$ is input to the filter 102 via a fuse and an input capacitor (not shown). The filter 102 removes noise included in the commercial AC voltage $V_{AC}$. The rectifier circuit 104 is configured as a diode bridge circuit which performs full-wave rectification of the commercial AC voltage $V_{AC}$. The output voltage of the rectifier circuit 104 is smoothed by the smoothing capacitor 106, thereby generating a converted DC voltage $V_{IN}$.

An insulated DC/DC converter 200r receives the DC voltage $V_{IN}$ via an input terminal P1, steps down the DC voltage $V_{IN}$ thus received, and supplies an output voltage $V_{OUT}$ stabilized to the target value to a load (not shown) connected to an output terminal P2.

The DC/DC converter 200r includes a primary-side controller 202, a photocoupler 204, a feedback circuit 206, an output circuit 210, a synchronous rectification controller 300r, and other circuit components. The output circuit 210 includes a transformer T1, a diode D1, an output capacitor C1, a switching transistor M1, and a synchronous rectification transistor M2. The output circuit 210 has the same topology as those of typical synchronous rectification flyback converters, and accordingly description thereof will be omitted.

The switching transistor M1 connected to the primary winding W1 of the transformer T1 performs switching so as to step down the input voltage $V_{IN}$, thereby generating the output voltage $V_{OUT}$. With such an arrangement, the primary-side controller 202 adjusts the duty ratio of the switching of the switching transistor M1.

The output voltage $V_{OUT}$ of the DC/DC converter 200r is divided by means of resistors R1 and R2. The feedback circuit 206 includes a shunt regulator or an error amplifier that amplifies the difference between the divided voltage (voltage detection signal) $V_S$ and a predetermined reference voltage ($V_{REF}$) (not shown), and generates an error current $I_{ERR}$ that corresponds to the difference, which is drawn (as a sink current) via a light-emitting element (light-emitting diode) arranged on the input side of the photocoupler 204.

A feedback current $I_{FB}$ flows through a light-receiving element (phototransistor) on the output side of the photocoupler 204 according to the error current $I_{ERR}$ that flows on the secondary side. The feedback current $I_{FB}$ is smoothed by means of a resistor and a capacitor, and is input to a feedback (FB) terminal of the primary-side controller 202. The primary-side controller 202 adjusts the duty ratio of the switching transistor M1 based on the voltage (feedback voltage) $V_{FB}$ at the FB terminal.

The synchronous rectification controller 300r switches on and off the synchronous rectification transistor M2 in synchronization with the switching of the switching transistor M1. The synchronous rectification controller 300r includes a pulse generator 304 and a driver 306. The pulse generator 304 generates a pulse signal S1 in synchronization with the switching of the switching transistor M1. For example, when the switching transistor M1 turns off, the pulse generator 304 sets the pulse signal S1 to a first state (e.g., high level) configured as an instruction to turn on the synchronous rectification transistor M2. When the secondary current $I_S$ that flows through the secondary winding W2 becomes substantially zero in an on period of the synchronous rectification transistor M2, the pulse generator 304 sets the pulse signal S1 to a second state (low level) configured as an instruction to turn off the synchronous rectification transistor M2.

During the on period of the switching transistor M1, the voltage across both ends of the secondary winding W2 is represented by $(-V_{IN} \times N_S/N_P)$. Accordingly, the drain voltage $V_D$ (i.e., drain-source voltage $V_{DS}$) of the synchronous rectification transistor M2 is represented by $(V_{OUT}+V_{IN} \times N_S/N_P)$. Here, $N_P$ and $N_S$ represent the number of turns of the primary winding W1 and the number of turns of the secondary winding W2, respectively.

When the switching transistor M1 turns off, the secondary current $I_S$ flows from the source to the drain of the synchronous rectification transistor M2. In this state, the drain-source voltage becomes a negative voltage. In the continuous mode, when the switching transistor M1 turns on, the secondary current $I_S$ becomes zero. In this stage, the drain voltage $V_D$ jumps up again to a value represented by $(V_{OUT}+V_{IN} \times N_S/N_P)$. In the discontinuous mode, when the synchronous rectification transistor M2 turns on, the energy stored in the transformer T1 decreases. In this state, the secondary current $I_S$ also decreases, which reduces the absolute value of the drain-source voltage $V_{DS}$. Eventually, the secondary current $I_S$ becomes substantially zero. In this stage, the drain-source voltage $V_{DS}$ also becomes substantially zero. In this state, ringing occurs in the drain voltage $V_D$.

Using this mechanism, the pulse generator 304 generates the pulse signal S1 based on the drain voltage (drain-source voltage) of the synchronous rectification transistor M2.

The driver 306 switches on and off the synchronous rectification transistor M2 according to the pulse signal S1. The above is the overall configuration of the AC/DC converter 100r.

The present inventors have come to recognize the following problems that occur in the DC/DC converter 200r shown in FIG. 1 when it operates in the continuous mode.

FIG. 2 is an operation waveform diagram showing the operation of the DC/DC converter 200r shown in FIG. 1 when it operates in the continuous mode. Before the time point t1, the switching transistor M1 turns on. In this state, the drain voltage $V_D$ of the synchronous rectification transistor M2 is represented by ($V_{OUT}+V_{IN}\times N_S/N_P$). When the transistor M1 is turned off at the time point t1, the secondary current $I_S$ starts to flow through the secondary winding W2. In this state, the drain voltage $V_D$ becomes a negative voltage. When the pulse generator 304 detects that the drain voltage $V_D$ crosses a first threshold voltage $V_{TH1}$ when it drops from the upper side to the lower side, the pulse generator 304 sets the pulse signal S1 to a first state. As a result, the synchronous rectification transistor M2 is turned on.

In the on period of the synchronous rectification transistor M2, the absolute value of the drain voltage $V_D$ decreases according to a reduction in the secondary current $I_S$. When the switching transistor M1 turns on at a time point t2, the secondary current $I_S$ becomes zero. In this state, the drain voltage $V_D$ jumps up again to a value represented by ($V_{OUT}+V_{IN}\times N_S/N_P$). When the drain voltage $V_D$ crosses a second threshold voltage $V_{TH2}$ when it rises from the lower side to the upper side, the pulse generator 304 sets the pulse signal S1 to a second state. As a result, the synchronous rectification transistor M2 is turned off.

With such an arrangement, there is a delay time period $\tau_D$ from the time point t2 at which the drain voltage $V_D$ crosses the threshold voltage $V_{TH2}$ up to a time point t3 at which the synchronous rectification transistor M2 turns off according to a transition of the pulse signal S1 to the second state. During the delay time $\tau_D$, the synchronous rectification transistor M2 turns on. In this state, a large voltage $V_D$ occurs across the synchronous rectification transistor M2 in a state in which it has an extremely low impedance. Accordingly, in some cases, this leads to a problem of a large amount of current flowing through the synchronous rectification transistor M2 (as indicated by the broken line IS').

During the delay time $\tau_D$, the large current $I_S'$ flows through the synchronous rectification transistor M2 via the secondary winding W2. When the synchronous rectification transistor M2 turns off at the time point t3, the current $I_S'$ that flows through the secondary winding W2 is cut off. This generates a high voltage across both ends of the secondary winding W2 as represented by $Vx=dI_S'/dt$. The high voltage Vx induces the voltage Vy across both ends of the primary winding W1 as represented by $Vy=-Vx\times N_P/N_S$. In a case in which the voltage Vy thus induced is applied to the switching transistor M1, in some cases, this leads to degradation of the reliability of the switching transistor M1.

In order to solve such problems, an approach is conceivable in which the primary-side controller 202 supplies, to the synchronous rectification controller 300, a timing signal which indicates the turn-on of the switching transistor M1. With such an arrangement, the synchronous rectification controller 300 turns off the synchronous rectification transistor M2 before the turn-on of the switching transistor M1.

However, with such an insulated converter, there is a need to provide electrical insulation between the primary side and the secondary side. Such an arrangement requires an additional photocoupler or a capacitor, leading to a problem of an increased circuit cost.

SUMMARY OF THE INVENTION

The present invention has been made in order to solve such problems. Accordingly, it is an exemplary purpose of an embodiment of the present invention to provide a DC/DC converter which is capable of solving a problem that can occur in the continuous mode.

An embodiment of the present invention relates to a synchronous rectification controller that controls a synchronous rectification transistor and that is arranged on a secondary side of an insulated synchronous rectification DC/DC converter. The synchronous rectification controller comprises: a pulse generator that generates a pulse signal based on a voltage across the synchronous rectification transistor such that, when the pulse generator detects that a switching transistor on a primary side of the DC/DC converter turns off, the pulse signal is set to an on level configured as an instruction to turn on the synchronous rectification transistor, and such that, when the pulse generator detects that a current that flows through a secondary winding of a transformer becomes substantially zero, the pulse signal is set to an off level configured as an instruction to turn off the synchronous rectification transistor; a driver that switches on and off the synchronous rectification transistor according to the pulse signal; and a forced turn-off circuit that forcibly turns off the synchronous rectification transistor after a predetermined time-up period elapses after the detection of a turn-on of the switching transistor.

The time-up period may be set to be shorter than the switching period of the switching transistor. In a case in which the switching transistor is configured to have a variable switching frequency, the time-up period may be set to be shorter than a period that corresponds to the maximum frequency of the switching transistor.

In a given cycle, the switching transistor is turned on and turned off, following which the synchronous rectification transistor turns on. Such an embodiment ensures that the synchronous rectification transistor turns off before the switching transistor turns on in the next cycle. Thus, such an arrangement is capable of solving a problem that can occur in the continuous mode.

Also, after the time-up period elapses after the detection of the turn-on of the switching transistor, the forced turn-off circuit may switch the pulse signal to the off level. Such an arrangement is capable of forcibly turning off the synchronous rectification transistor.

Also, the pulse generator may comprise: a set signal generating unit that generates a set signal which is asserted when the turn-off of the switching transistor is detected; a reset signal generating unit that generates a reset signal which is asserted when it is detected that the current that flows through the secondary winding of the transformer becomes substantially zero; and a flip-flop that generates the pulse signal which is switched to an on level when the set signal is asserted, and which is switched to an off level when the reset signal is asserted.

Also, the forced turn-off circuit may generate a forced turn-off signal which is asserted after the time-up period elapses after the detection of the turn-on of the switching transistor. Also, when at least one from among the reset signal and the forced turn-off signal is asserted, the flip-flop may set the pulse signal to an off level.

Also, when the reset signal is asserted, the forced turn-off circuit may start time measurement.

In the continuous mode, as a result of turning on the switching transistor, the secondary current becomes zero. Thus, such an embodiment is capable of detecting, based on the assertion of the reset signal, whether or not the switching transistor turns on.

Also, the set signal generating unit may comprise a first comparator that compares a voltage across the synchronous rectification transistor with a first threshold voltage, and that outputs the set signal according to a comparison result. Also, the reset signal generating unit may comprise a second comparator that compares the voltage across the synchronous rectification transistor with a second threshold voltage, and that outputs the reset signal according to a comparison result.

The synchronous rectification controller according to an embodiment may further comprise a third comparator that compares a voltage across the synchronous rectification transistor with a third threshold voltage configured as a predetermined positive voltage. Also, when the voltage across the synchronous rectification transistor crosses the third threshold voltage, the time measurement operation of the forced turn-off circuit may be reset.

When the synchronous rectification transistor turns off in the discontinuous mode, the voltage across the synchronous rectification transistor rises, following which oscillation occurs due to resonance in the voltage across the synchronous rectification transistor. With such an embodiment, the voltage across the synchronous rectification transistor is compared with the third threshold voltage so as to detect a rise of this voltage that occurs in the discontinuous mode. Thus, in the discontinuous mode, by resetting the time measurement operation, such an arrangement is capable of disabling the forced turn-off function.

Also, the third threshold voltage may be configured as an output voltage of the DC/DC converter, or otherwise a voltage that is offset with respect to the output voltage.

In the discontinuous mode, when the synchronous rectification transistor turns off, the voltage across the synchronous rectification transistor rises, following which this voltage settles to the voltage level of the output voltage. Thus, by setting the third threshold voltage based on the output voltage, such an arrangement is capable of detecting the discontinuous mode in a sure manner.

Also, the forced turn-off circuit may comprise: a capacitor having one end supplied with a fixed electric potential; a current source that supplies a current to the capacitor; a discharge circuit that discharges the capacitor in response to the turn-on of the switching transistor; and a fourth comparator that compares a voltage across the capacitor with a fourth threshold voltage. Also, the forced turn-off circuit may assert a forced turn-off signal when the voltage across the capacitor exceeds the fourth threshold voltage.

Also, the current source may supply a current having a current value that is adjustable according to a resistance value of an external resistor externally coupled to the current source.

This allows the time-up period to be set according to the resistance value.

The synchronous rectification controller according to an embodiment may further comprise a turn-on detection circuit that comprises a fifth comparator that compares a voltage across the synchronous rectification transistor with a fifth threshold voltage, and that asserts a turn-on detection signal which indicates a turn-on of the switching transistor when the voltage across the synchronous rectification transistor crosses the fifth threshold voltage. Also, when the turn-on detection signal is asserted, the forced turn-off circuit may start time measurement.

When the switching transistor turns on, the voltage across both terminals of the synchronous rectification transistor rises and becomes a voltage that is higher than the output voltage of the DC/DC converter. Thus, by setting the fifth threshold voltage to a suitable value, such an arrangement is capable of detecting whether or not the switching transistor turns on.

Another embodiment of the present invention also relates to a synchronous rectification controller. The synchronous rectification controller comprises: a first comparator that compares a voltage across the synchronous rectification transistor with a first threshold voltage, and that asserts a set signal when the voltage across the synchronous rectification transistor becomes lower than the first threshold voltage; a second comparator that compares the voltage across the synchronous rectification transistor with a second threshold voltage, and that asserts a reset signal when the voltage across the synchronous rectification transistor becomes higher than the second threshold voltage; a flip-flop that generates a pulse signal which is switched to an on level when the set signal is asserted, and which is switched to an off level when the reset signal is asserted; and a forced turn-off circuit that forcibly turns off the synchronous rectification transistor after a predetermined time-up period elapses after the reset signal is asserted.

Such an embodiment ensures that the synchronous rectification transistor turns off before the switching transistor turns on in the next cycle. Thus, such an arrangement is capable of solving a problem that can occur in the continuous mode.

Also, the forced turn-off circuit may generate a forced turn-off signal which is asserted after the time-up period elapses after the reset signal is asserted. Also, when at least one from among the reset signal and the forced turn-off signal is asserted, the flip-flop may switch the pulse signal to an off level.

The synchronous rectification controller according to an embodiment may further comprise a third comparator that compares a voltage across the synchronous rectification transistor with a third threshold voltage configured as a predetermined positive voltage. Also, the voltage across the synchronous rectification transistor crosses the third threshold voltage, the time measurement operation of the forced turn-off circuit may be reset.

Also, the third threshold voltage may be configured as an output voltage of the DC/DC converter, or otherwise a voltage that is offset with respect to the output voltage.

Also, the forced turn-off circuit may comprise: a capacitor having one end supplied with a fixed electric potential; a current source that supplies a current to the capacitor; a discharge circuit that discharges the capacitor in response to the reset signal; and a fourth comparator that compares a voltage across the capacitor with a fourth threshold voltage. Also, the forced turn-off circuit may output a forced turn-off signal which is asserted when the voltage across the capacitor exceeds the fourth threshold voltage.

Also, the current source may supply a current having a current value that is adjustable according to a resistance value of an external resistor externally coupled to the current source.

The synchronous rectification controller according to an embodiment may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

By monolithically integrating the circuit on a single chip, such an arrangement allows the circuit area to be reduced, and allows the circuit elements to have uniform characteristics.

Another embodiment of the present invention relates to an insulated synchronous rectification DC/DC converter. The DC/DC converter comprises: a transformer comprising a primary winding and a secondary winding; a switching transistor connected to the primary winding of the transformer; a synchronous rectification transistor connected to the secondary winding of the transformer; a photocoupler; a primary-side controller that is connected to an output side of the photocoupler, and that switches on and off the switching transistor according to a feedback signal received from the photocoupler; any one of the aforementioned synchronous rectification controllers that control the synchronous rectification transistor; and a feedback circuit that is connected to an input side of the photocoupler, and that generates an error current that corresponds to an output voltage of the DC/DC converter.

The DC/DC converter may be configured as a flyback converter or a forward converter.

Yet another embodiment of the present invention relates to a power supply apparatus (AC/DC converter). The power supply apparatus comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to a load.

Yet another embodiment of the present invention relates to an electronic device. The electronic device comprises: a load; a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to the load.

Yet another embodiment of the present invention relates to an AC adapter. The AC adapter comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage so as to generate a DC output voltage.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
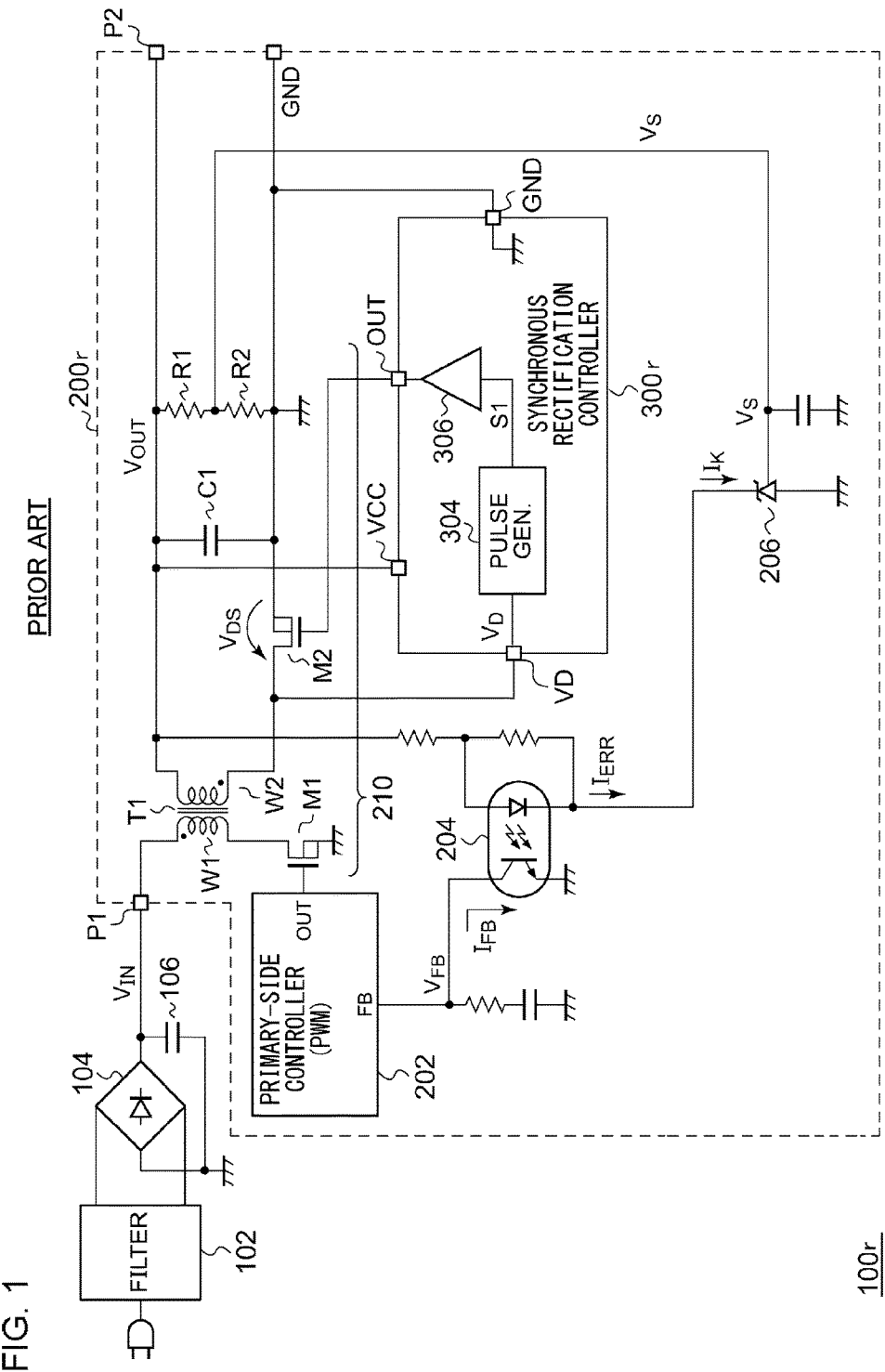
FIG. 1 is a block diagram showing a basic configuration of an AC/DC converter investigated by the present inventor.
Figure 2:
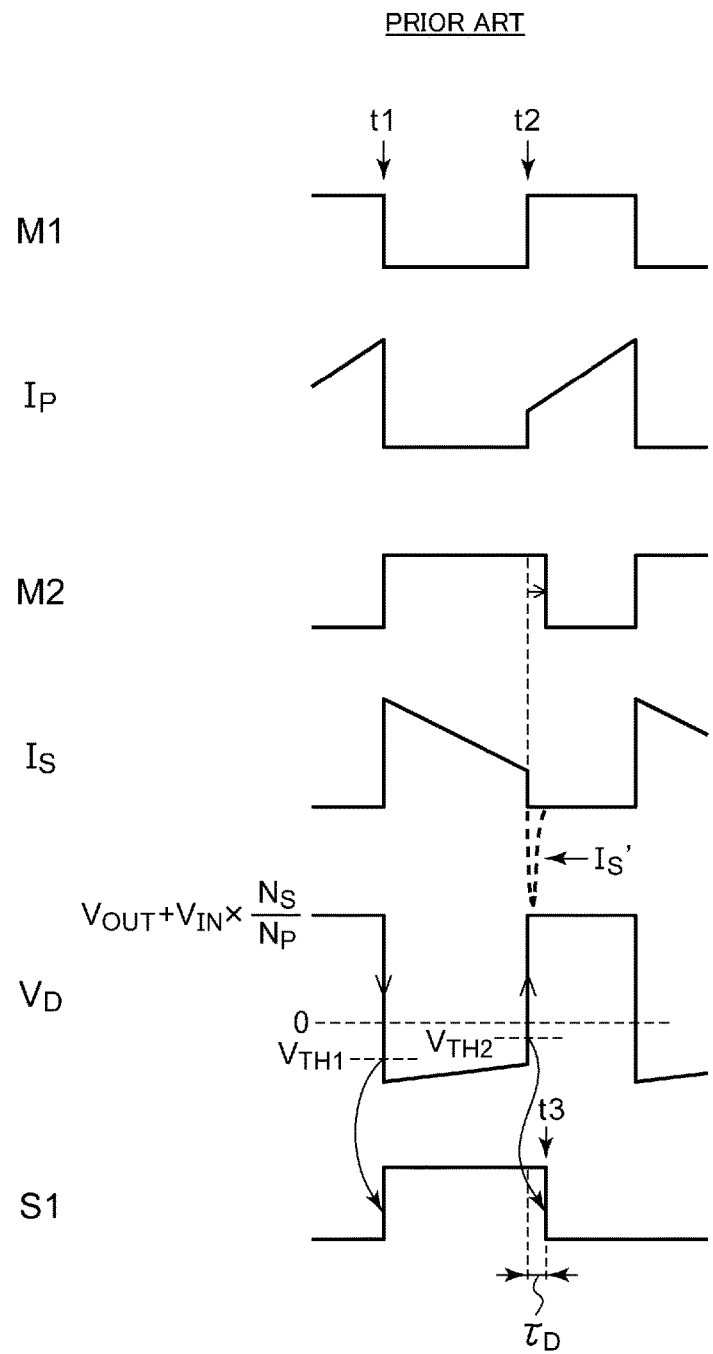
FIG. 2 is an operation waveform diagram showing the operation of a DC/DC converter shown in FIG. 1 when it operates in the continuous mode.
Figure 3:
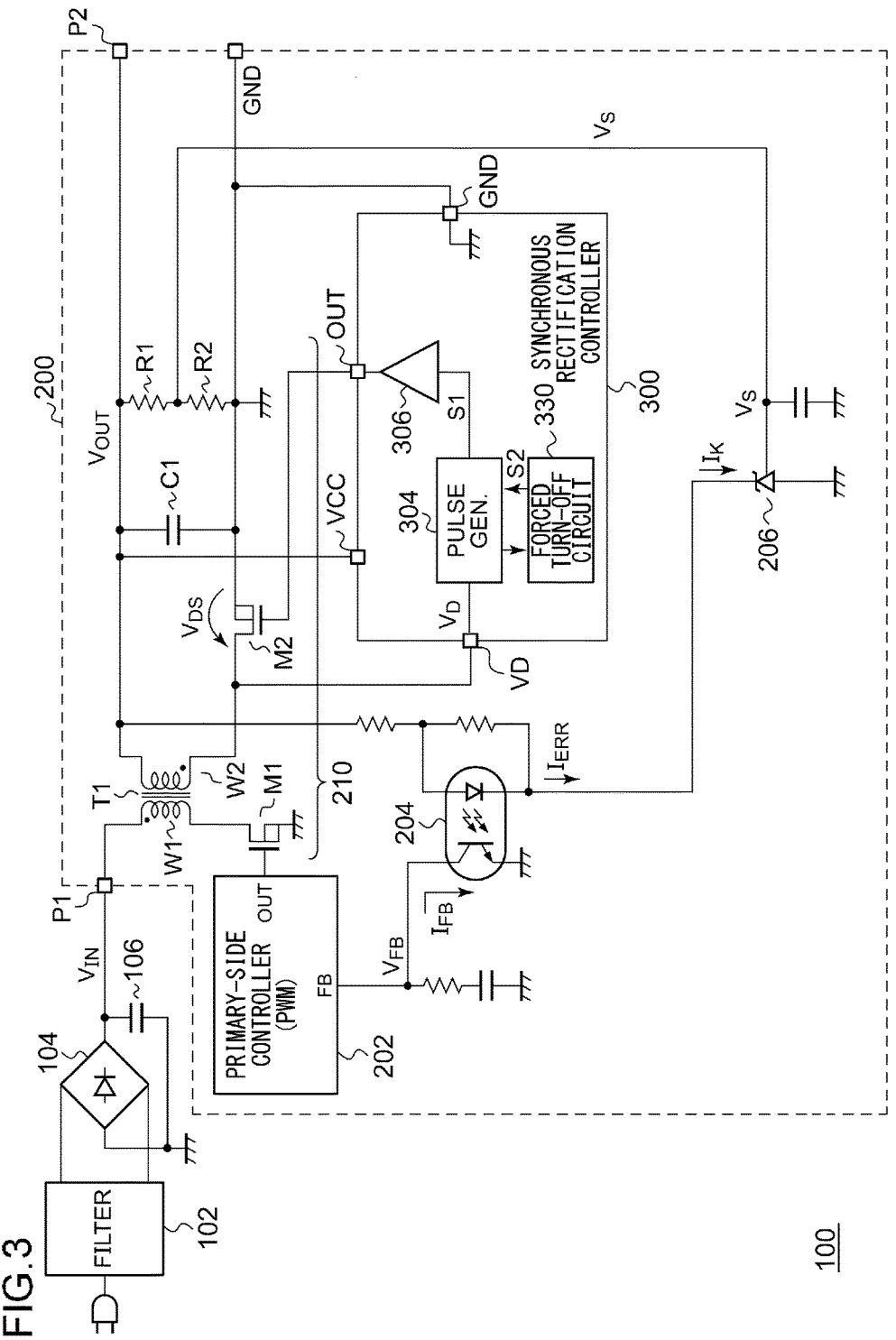
FIG. 3 is a circuit diagram showing a DC/DC converter including a synchronous rectification controller according to an embodiment.

FIG. 3 is a circuit diagram showing a DC/DC converter 200 including a synchronous rectification controller 300 according to an embodiment. An AC/DC converter 100 and a DC/DC converter 200 respectively have the same basic configurations as those of the AC/DC converter 100r and the DC/DC converter 200r shown in FIG. 1.

The synchronous rectification controller 300 includes a power supply (VCC) terminal, a switching output (OUT) terminal, a drain voltage (VD) terminal, and a ground (GND) terminal, and is configured as a function IC (Integrated Circuit) integrated on a single semiconductor substrate. The synchronous rectification controller 300 may be housed in the same package together with a synchronous rectification transistor M2 so as to form a single monolithically integrated module.

The output voltage $V_{OUT}$ of the DC/DC converter 200a is supplied to the VCC terminal of the synchronous rectification controller 300. The GND terminal of the synchronous rectification controller 300 is connected to the source of the synchronization rectification transistor M2 and is grounded. The VD terminal of the synchronous rectification controller 300 is connected to the drain of the synchronous rectification transistor M2. The OUT terminal of the synchronous rectification controller 300 is connected to the gate of the synchronous rectification transistor M2.

The synchronous rectification controller 300 is arranged such that its GND terminal is connected to the source of the synchronous rectification transistor M2. With such an arrangement, the synchronous rectification controller 300 operates with the source voltage as a reference voltage. Thus, the drain voltage $V_D$ at the VD terminal is equivalent to the voltage (drain-source voltage) $V_{DS}$ across the synchronous rectification transistor M2.

The synchronous rectification controller 300 includes a pulse generator 304, a driver 306, and a forced turn-off circuit 330.

The pulse generator 304 generates a pulse signal S1 based on the voltage $V_{DS}$ across the synchronous rectification transistor M2. When the pulse generator 304 detects that the switching transistor M1 on the primary side of the DC/DC converter 200 turns off, the pulse signal S1 is set to an on level (e.g., high level) configured as an instruction to turn on the synchronous rectification transistor M2. When the pulse generator 304 detects that the secondary current $I_S$ that flows through the secondary winding W2 of the transistor T1 has become substantially zero, the pulse generator 304 sets the pulse signal S1 to an off level (e.g., low level) configured as an instruction to turn off the synchronous rectification transistor M2. The driver 306 switches on and off the synchronous rectification transistor M2 according to the pulse signal S1.

The forced turn-off circuit 330 forcibly turns off the synchronous rectification transistor M2 if it is in the on state after a predetermined time-up period $T_{UP}$ elapses after the detection of the turn-on of the switching transistor M1. In the present embodiment, at a timing at which the synchronous rectification transistor M2 is to be forcibly turned off, the forced turn-off circuit 330 asserts a forced turn-off signal S2. The pulse signal S1 is switched to the off level (low level) using the forced turn-off signal S2.

The time-up period $T_{UP}$ is set to a time period that is shorter than the switching period $T_{SW}$ of the switching transistor M1. In a case in which the switching frequency $f_{SW}$ is variable according to the load, the time-up period $T_{UP}$ may preferably be set to a time period that is shorter than a period $T_{SWMAX}$ calculated based on a maximum frequency $f_{MAX}$ represented by $1/T_{SWMAX}$.

It should be noted that the method for forcibly turning off the synchronous rectification transistor M2 is not restricted in particular. In another embodiment, for example, a logic gate is arranged as an additional component between the pulse generator 304 and the driver 306 so as to mask the pulse signal S1. Also, a low-side transistor (not shown) of a push-pull output stage of the driver 306 may be forcibly turned on.

The above is the configuration of the synchronous rectification controller 300. Next, description will be made regarding the operation thereof.

Figure 4:
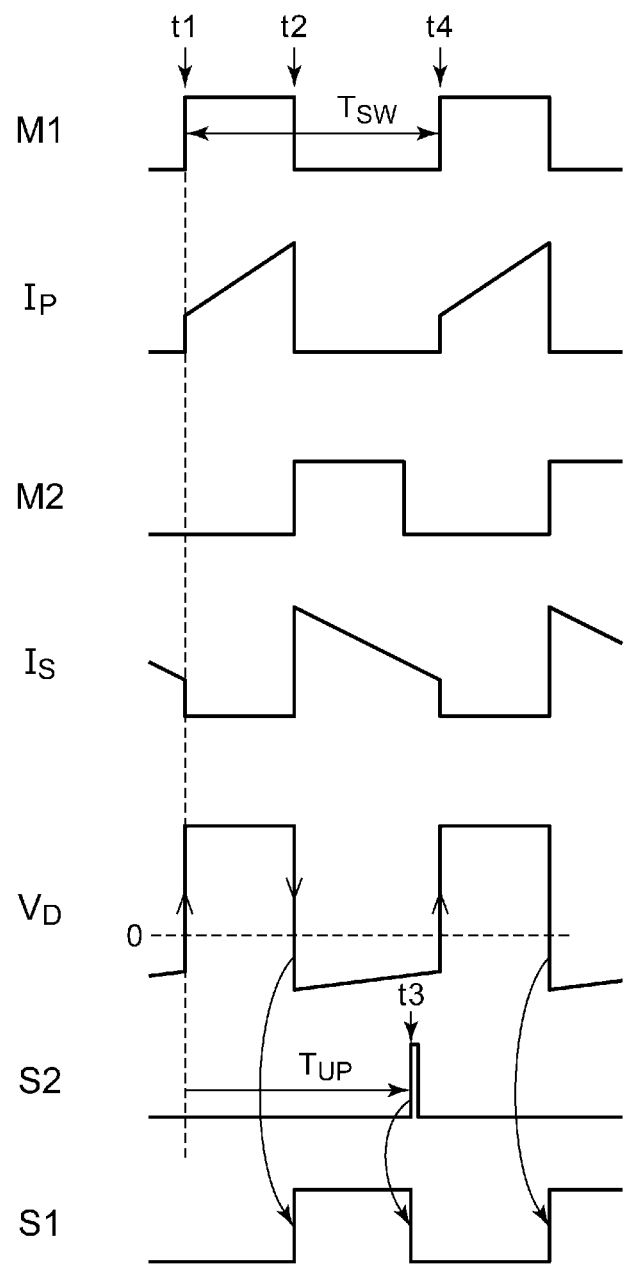
FIG. 4 is an operation waveform diagram showing the operation of the DC/DC converter shown in FIG. 3 when it operates in the continuous mode.

FIG. 4 is an operation waveform diagram showing the operation of the DC/DC converter 200 shown in FIG. 3 when it operates in the continuous mode. At the time point t1, the switching transistor M1 is turned on. When the switching transistor M1 turns on, the forced turn-off circuit 330 starts time measurement. When the time-up period $T_{UP}$ elapses, the forced turn-off signal S2 is asserted. With such an arrangement, the time-up period $T_{UP}$ is determined so as to satisfy the relation $T_{UP}<T_{SW}$. Thus, the pulse signal S1 is switched to the off level before the time point t4 at which the switching transistor M1 turns on in the next cycle. That is to say, such an arrangement is capable of turning off the synchronous rectification transistor M2 before the time point t4 at which the switching transistor M1 turns on in the next cycle.

Figure 5:
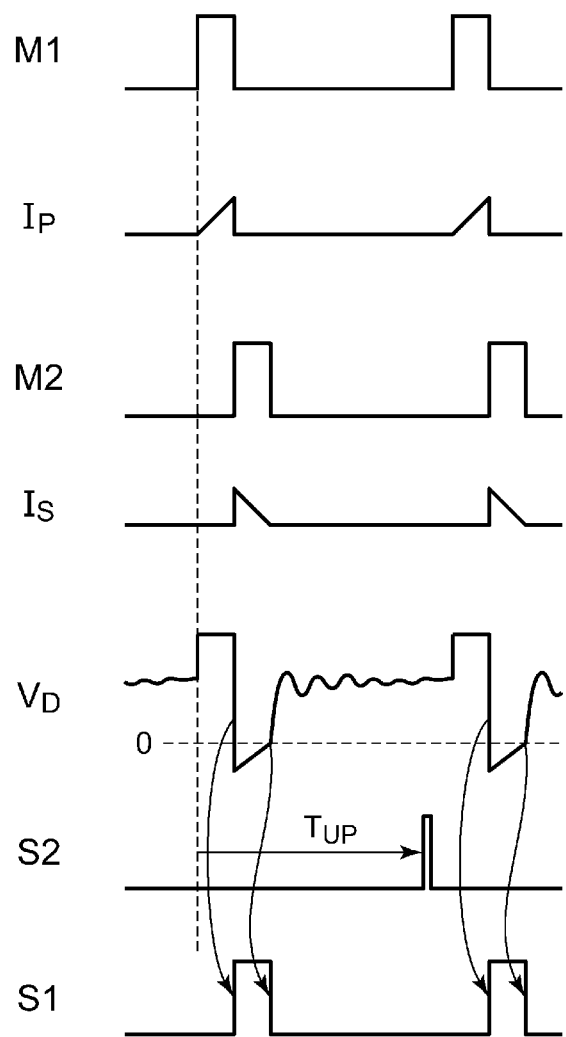
FIG. 5 is an operation waveform diagram showing the operation of the DC/DC converter shown in FIG. 3 when it operates in the discontinuous mode.

FIG. 5 is an operation waveform diagram showing the operation of the DC/DC converter 200 shown in FIG. 3 when it operates in the discontinuous mode. In the discontinuous mode, the secondary current $I_S$ becomes substantially zero before the assertion of the forced turn-off signal S2. Accordingly, the synchronous rectification transistor M2 switches on and off without involving forced turning-off according to the forced turn-off signal S2.

The above is the operation of the DC/DC converter 200.

With the DC/DC converter 200, as shown in FIG. 4, in the continuous mode, the synchronous rectification transistor M2 turns off before the switching transistor M1 turns on. Thus, such an arrangement is capable of solving a problem that can occur in the continuous mode. Such an arrangement configured to provide such a control operation does not require the primary-side controller 202 to supply, to the synchronous rectification controller 300, a timing signal that indicates the turn-on of the switching transistor M1. That is to say, such an arrangement requires no additional component such as a photocoupler or a capacitor used to transmit a timing signal, thereby providing an advantage from the cost viewpoint.

The present invention encompasses various kinds of circuits that can be regarded as a block configuration shown in FIG. 3. Description will be made below regarding specific examples thereof.

Figure 6:
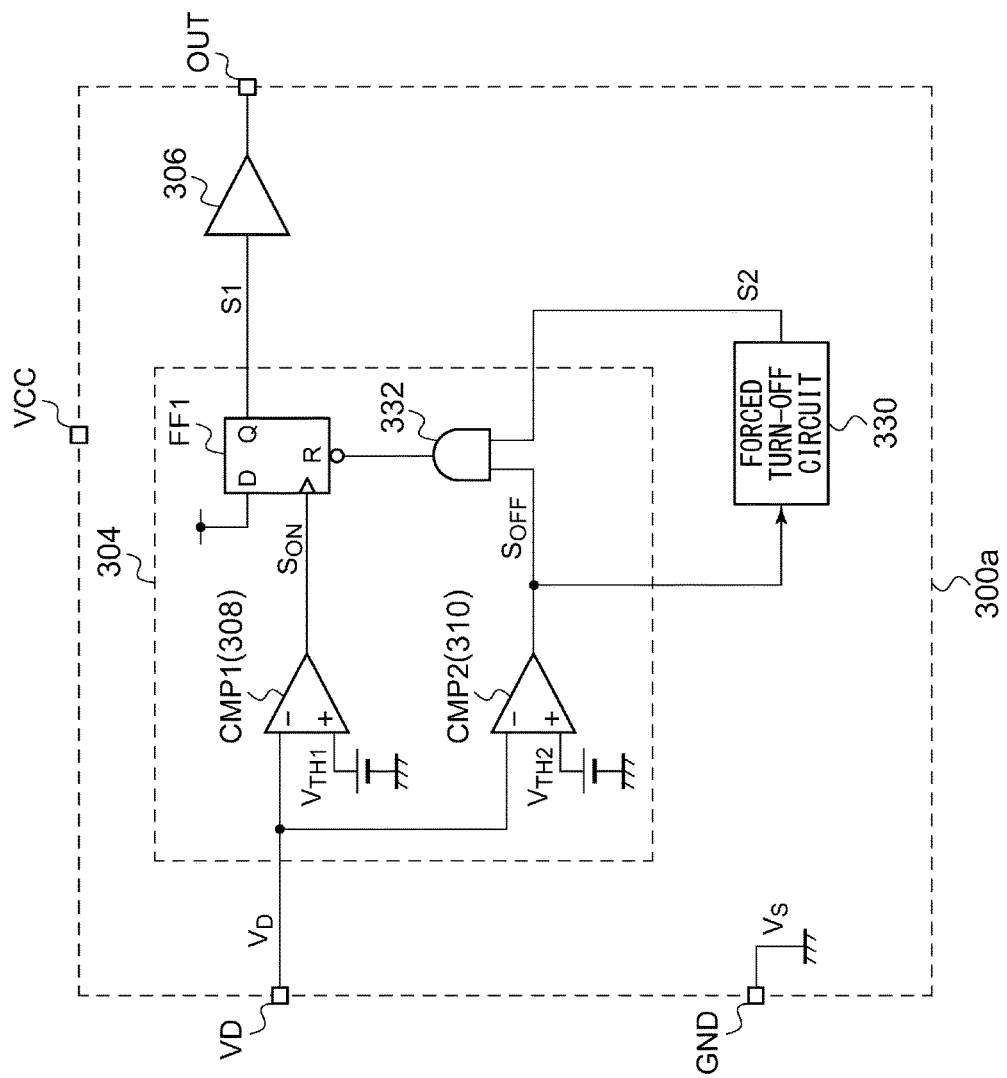
FIG. 6 is a circuit diagram showing a synchronous rectification controller according to a first example configuration.

FIG. 6 is a circuit diagram showing a synchronous rectification controller 300a according to a first example configuration.

The pulse generator 304 includes a set signal generating unit 308, a reset signal generating unit 310, and a D flip-flop FF1. The synchronous rectification controller 300a is arranged such that its GND terminal is connected to the source of the synchronous rectification transistor M2. Accordingly, with the synchronous rectification controller 300a, the voltage $V_D$ at the VD terminal corresponds to the drain-source voltage of the synchronous rectification transistor M2.

As described above, (i) when the switching transistor M1 turns off, the pulse generator 304 sets the pulse signal S1 to a first state (high level). (ii) When the current $I_S$ that flows through the secondary winding W2 becomes zero in the on period of the synchronous rectification transistor M2, the pulse generator 304 sets the pulse signal S1 to a second state (low level).

The set signal generating unit 308 includes a first comparator CMP1 in order to detect (i) whether or not the switching transistor M1 turns off. The first comparator CMP1 compares the drain voltage (drain-source voltage) $V_D$ at the VD terminal with a predetermined negative first threshold voltage $V_{TH1}$ (e.g., −150 mV). When the drain voltage $V_D$ crosses the first threshold voltage $V_{TH1}$, the first comparator CMP1 asserts (sets to high level) a set signal $S_{ON}$. Specifically, when the drain voltage $V_D$ becomes lower than the threshold voltage $V_{TH1}$, i.e., when the drain-source voltage $V_{DS}$ becomes a negative voltage, the set signal $S_{ON}$ is set to the high level. The set signal $S_{ON}$ is input to a clock terminal of the D flip-flop FF1. The pulse signal S1 is switched to the high level in response to a positive edge that occurs in the set signal $S_{ON}$. Instead of the D flip-flop FF1, an RS flip-flop may be employed.

The reset signal generating unit 310 includes a second comparator CMP2 in order to detect (ii) whether or not the secondary current $I_S$ that flows through the secondary winding W2 becomes substantially zero in the on period of the synchronous rectification transistor M2. In the off period of the switching transistor M1, the current $I_S$ flows from the source to the drain of the synchronous rectification transistor M2. Thus, the drain-source voltage $V_{DS}$ becomes a negative voltage having an absolute value that corresponds to the current value of the current $I_S$. Using this mechanism, the second comparator CMP2 compares the drain voltage $V_D$ with a negative threshold voltage $V_{TH2}$ (e.g., −10 mV) set to a negative value in the vicinity of zero. When the drain voltage $V_D$ becomes higher than the threshold voltage $V_{TH2}$, the second comparator CMP2 asserts (set to low level) a reset signal $S_{OFF}$. The reset signal $S_{OFF}$ is input to a reset terminal (logical inversion) of the flip-flop FF1. The pulse signal S1 is switched to the low level in response to a negative edge of the reset signal $S_{OFF}$.

When at least one from among the reset signal $S_{ON}$ and the forced turn-off signal S2 is asserted (set to low level), the flip-flop FF1 sets the pulse signal S1 to the off level (low level). In order to provide such an operation, a logic circuit 332 is provided. The logic circuit 332 performs a logical operation on the forced turn-off signal S2 and the reset signal $S_{OFF}$, and outputs the logical value thus obtained to a reset terminal (logical inversion) of the flip-flop FF1. With such an arrangement, the logic circuit 332 is configured as an AND gate. Also, the configuration thereof may be modified as appropriate according to the logical values of the corresponding signals.

As shown in FIG. 4, in the continuous mode, the secondary current $I_S$ becomes zero according to the turn-on of the switching transistor M1. In this stage, the drain voltage $V_D$ jumps up. Thus, the timing at which the second comparator CMP2 detects that the current becomes zero substantially matches the timing at which the switching transistor M1 turns on. Using this mechanism, when the reset signal $S_{OFF}$ is asserted, the forced turn-off circuit 330 starts time measurement on the assumption that the switching transistor M1 turns on when the reset signal $S_{OFF}$ is asserted.

The synchronous rectification controller 300a shown in FIG. 6 is capable of solving various kinds of problems that can occur in the continuous mode.

Figure 7:
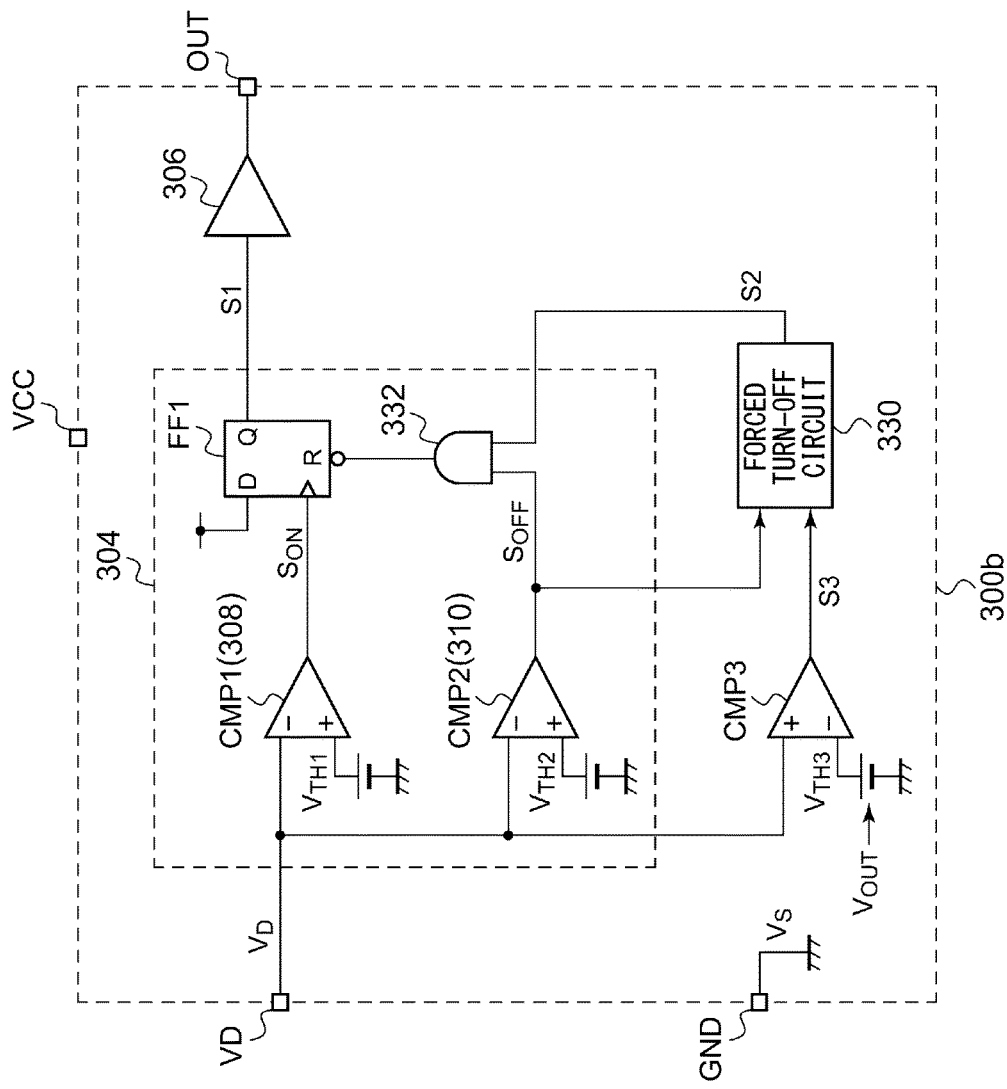
FIG. 7 is a circuit diagram showing a synchronous rectification controller according to a second example configuration.

FIG. 7 is a circuit diagram showing a synchronous rectification controller 300b according to a second example configuration.

The synchronous rectification controller 300b further includes a third comparator CMP3 in addition to the configuration of the synchronous rectification controller 300a shown in FIG. 6. The third comparator CMP3 compares the drain-source voltage $V_{DS}$ of the synchronous rectification transistor with a predetermined positive third threshold voltage $V_{TH3}$. When the output S3 of the third comparator CMP3 indicates that the drain-source voltage $V_{DS}$ crosses the third threshold voltage $V_{TH3}$, the time measurement operation of the forced turn-off circuit 330 is reset.

The third threshold voltage $V_{TH3}$ is preferably generated based on the output voltage $V_{OUT}$. Specifically, the third threshold voltage $V_{TH3}$ is set to the output voltage $V_{OUT}$ or otherwise a value in the vicinity of the output voltage $V_{OUT}$. Also, the third threshold voltage $V_{TH3}$ may be configured as a voltage that is offset with respect to the output voltage $V_{OUT}$.

Figure 8:
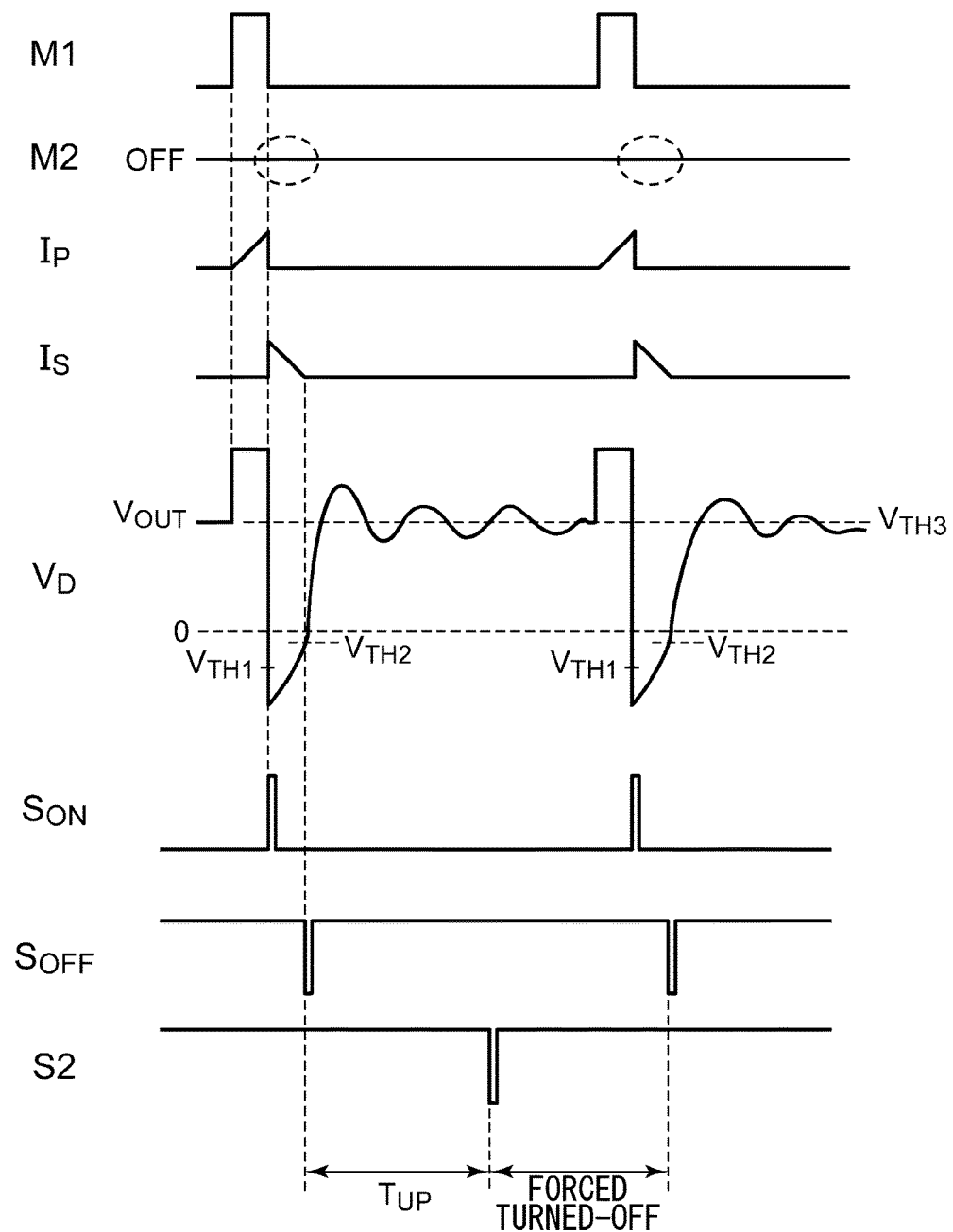
FIG. 8 is a diagram for describing the problem that can occur in the synchronous rectification controller shown in FIG. 6.

The synchronous rectification controller 300b is capable of solving a problem that can occur in the synchronous rectification controller 300a. First, description will be made regarding the problem. FIG. 8 is a diagram for describing a problem that can occur in the synchronous rectification controller 300a shown in FIG. 6. In some cases, as the load current $I_{OUT}$ becomes smaller, the primary-side controller 202 of the DC/DC converter 200 reduces the switching frequency $f_{SW}$ so as to reduce its switching loss, thereby providing improved efficiency. In a case of employing a combination of such a primary-side controller 202 and the synchronous rectification controller 300a shown in FIG. 6, such an arrangement is not capable of turning on the synchronous rectification transistor M2 when the DC/DC converter 200 operates in the discontinuous mode in a low range of the switching frequency $f_{SW}$, i.e., in a state in which the switching transistor switches on and off with a long switching period. That is to say, in this state, the synchronous rectification transistor M2 operates in the diode rectification mode.

In contrast, the synchronous rectification controller 300a shown in FIG. 6 uses the output $S_{OFF}$ of the second comparator CMP2 in order to detect whether or not the switching transistor M1 turns on. In the continuous mode, as a result of turning on the switching transistor M1, the secondary current $I_S$ becomes zero. Thus, the time point at which the reset signal $S_{OFF}$ transits indicates that the switching transistor M1 turns on. However, in the discontinuous mode, the secondary current $I_S$ becomes zero before the switching transistor M1 turns on. Accordingly, the assertion of the reset signal $S_{OFF}$ does not correspond to the turn-on of the switching transistor M1.

When the time-up period $T_{UP}$ elapses after the reset signal $S_{OFF}$ is asserted, the synchronous rectification transistor M2 is forcibly turned off. The state in which the synchronous rectification transistor M2 is forcibly turned off is canceled according to the next assertion of the reset signal $S_{OFF}$. Accordingly, the set signal $S_{ON}$ is asserted in the forced turn-off period. Thus, the pulse signal S1 is maintained at the low level, leading to a problem in that the synchronous rectification transistor M2 cannot be turned on.

That is to say, such a synchronous rectification controller 300a has a problem in that, in some cases, in the discontinuous mode, the synchronous rectification transistor M2 cannot be switched on and off, i.e., it operates in the diode rectification mode alone.

Figure 9:
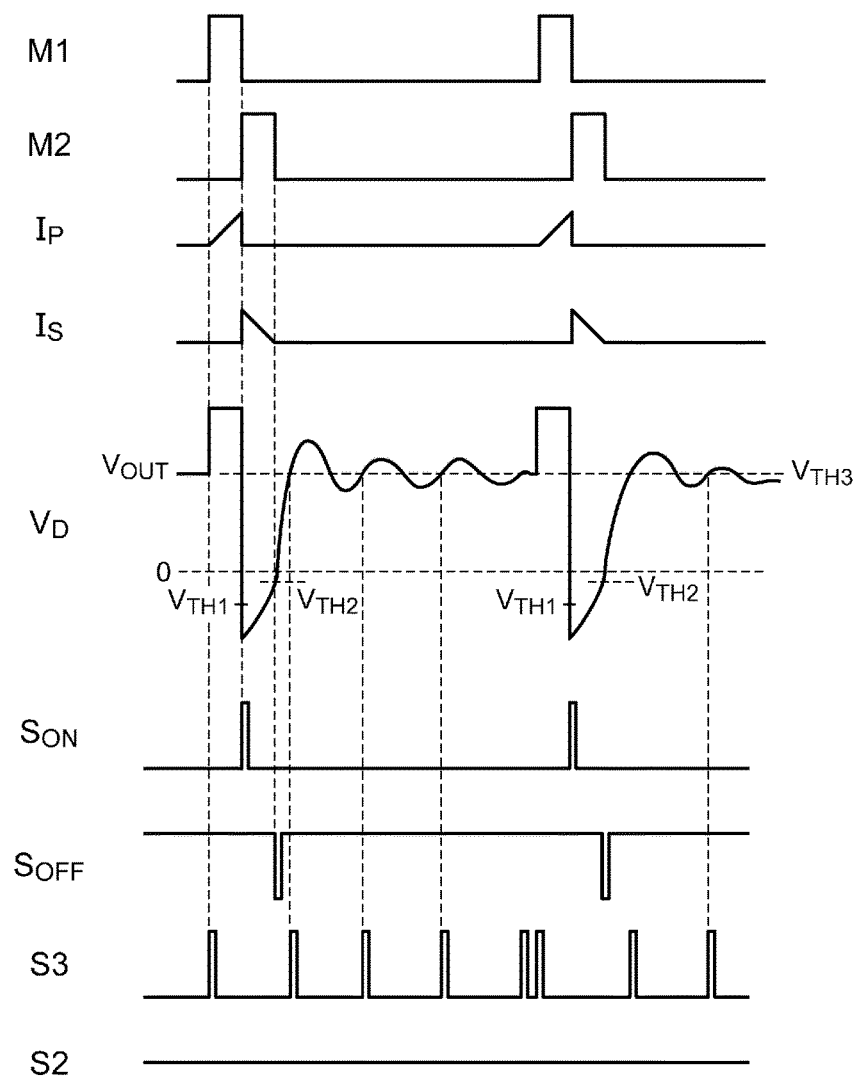
FIG. 9 is an operation waveform diagram showing the operation of the synchronous rectification controller shown in FIG. 7 when it operates in the discontinuous mode.

The synchronous rectification controller 300b shown in FIG. 7 is capable of solving such a problem. FIG. 9 is an operation waveform diagram showing the operation of the synchronous rectification controller 300b when it operates in the discontinuous mode. When the synchronous rectification transistor M2 turns off in the discontinuous mode, the drain voltage $V_D$ rises. Subsequently, damped oscillation occurs in the drain voltage $V_D$ with the output voltage $V_{OUT}$ as the center of oscillation. During the damped oscillation, crossing of the threshold voltage $V_{TH3}$ by the drain voltage $V_D$ repeatedly occurs. The time measurement operation of the forced turn-off circuit 330 is reset every time the drain voltage $V_D$ crosses the threshold voltage $V_{TH3}$. Accordingly, in this case, the forced turn-off signal S2 is not asserted. Thus, such an arrangement is capable of maintaining a synchronous rectification operation, i.e., of ensuring the switching operation of the synchronous rectification transistor M2, even if it operates in the discontinuous mode.

Figure 10A:
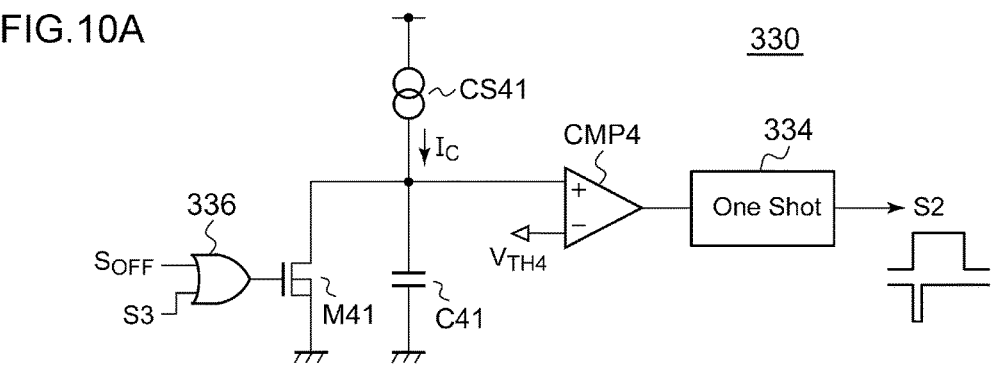
FIG. 10A is a circuit diagram showing an example configuration of a forced turn-off circuit.

FIG. 10A is a circuit diagram showing an example configuration of the forced turn-off circuit 330. The forced turn-off circuit 330 is configured as an analog timer circuit including a capacitor C41, a current source CS41, a discharge circuit M41, a fourth comparator CMP4, and a one-shot circuit 334. The current source CS41 supplies a current $I_c$ to the capacitor C41. The discharge circuit M41 discharges the capacitor C41 in response to the reset signal $S_{OFF}$ so as to reset the time measurement operation. For example, the discharge circuit M41 may be configured as a transistor. The fourth comparator CMP4 compares a voltage $V_{C41}$ across the capacitor C41 with a predetermined fourth threshold voltage $V_{TH4}$. The one-shot circuit 334 outputs the forced turn-off signal S2 which is set to a low level (asserted) for a predetermined time period when the voltage $V_{C41}$ across the capacitor C41 exceeds the fourth threshold voltage $V_{TH4}$.

In the synchronous rectification controller 300b shown in FIG. 7, the discharge circuit M41 is configured such that, when at least one from among the reset signal $S_{OFF}$ and the output S3 of the third comparator CMP3 is asserted, the discharge circuit M41 discharges the capacitor C41 so as to reset the time measurement operation. In order to provide such an operation, an OR gate 336 may be provided.

Figure 10B:
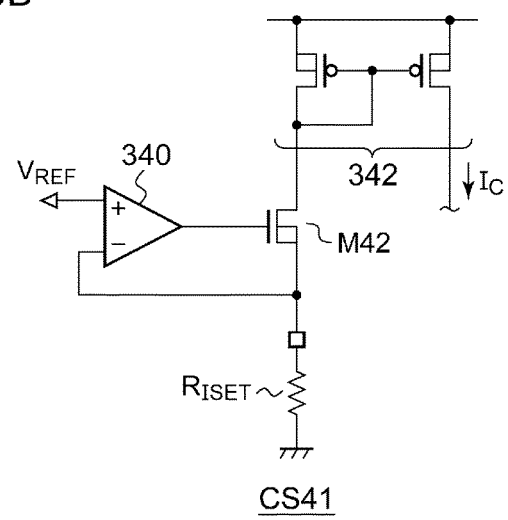
FIG. 10B is a circuit diagram showing a current source shown in FIG. 10A.

FIG. 10B is a circuit diagram showing the current source CS41 shown in FIG. 10A. The current source CS41 includes a transistor M42, an operational amplifier 340, an external resistor $R_{ISET}$, and a current mirror circuit 342. A current $V_{REF}/R_{ISET}$ that corresponds to the external resistor $R_{ISET}$ flows through the transistor M42. The current mirror circuit 342 mirrors the current $V_{REF}/R_{ISET}$, and supplies the mirror current thus generated to the capacitor C41. Such a configuration allows the time-up period $T_{UP}$ for the forced turn-off circuit 330 to be set according to the resistor $R_{ISET}$.

The forced turn-off circuit 330 may be configured as a digital timer employing a counter instead of such an analog timer.

[Usage]

Next, description will be made regarding the usage of the DC/DC converter 200 described in the embodiment.

Figure 11:
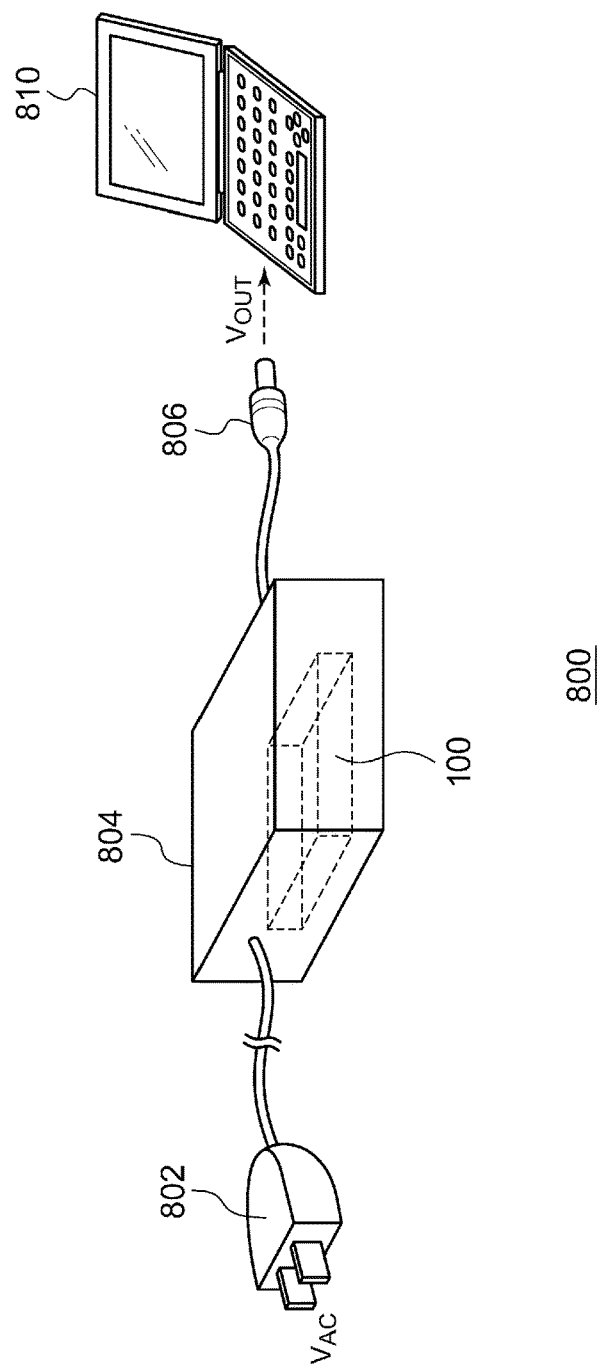
FIG. 11 is a diagram showing an AC adapter including an AC/DC converter.

FIG. 11 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ is supplied from the connector 806 to an electronic device 810. Examples of such an electronic device 810 include laptop PCs, digital still cameras, digital video cameras, cellular phones, portable audio players, and the like.

Figure 12A:
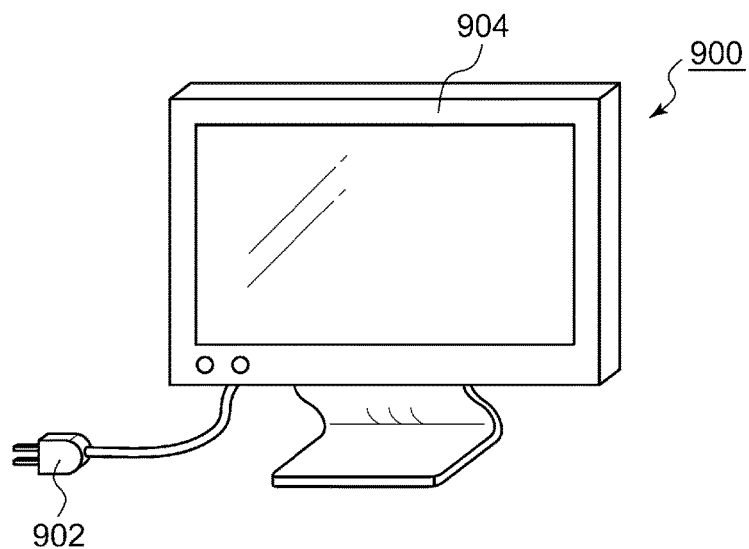
FIGS. 12A and 12B are diagrams each showing an electronic device including an AC/DC converter.
Figure 12B:
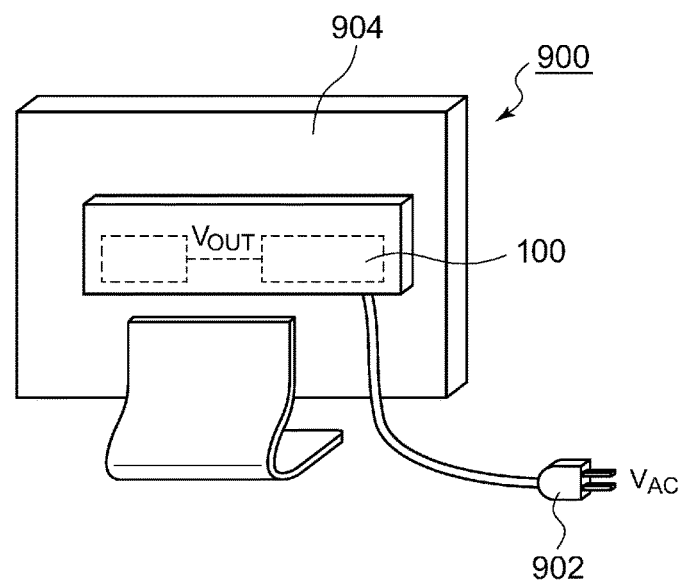

FIGS. 12A and 12B are diagrams each showing an electronic device 900 including the AC/DC converter 100. The electronic device 900 shown in FIGS. 12A and 12B is configured as a display apparatus. However, the electronic device 900 is not particularly restricted in kind, as long as it includes a power supply apparatus as an internal component.

Examples of such an electronic device 900 include audio devices, refrigerators, washing machines, vacuum cleaners, etc.

A plug 902 receives commercial AC voltage $V_{AC}$ from an unshown electrical outlet. The AC/DC converter 100 is mounted within the housing 904. The DC output voltage $V_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Figure 13:
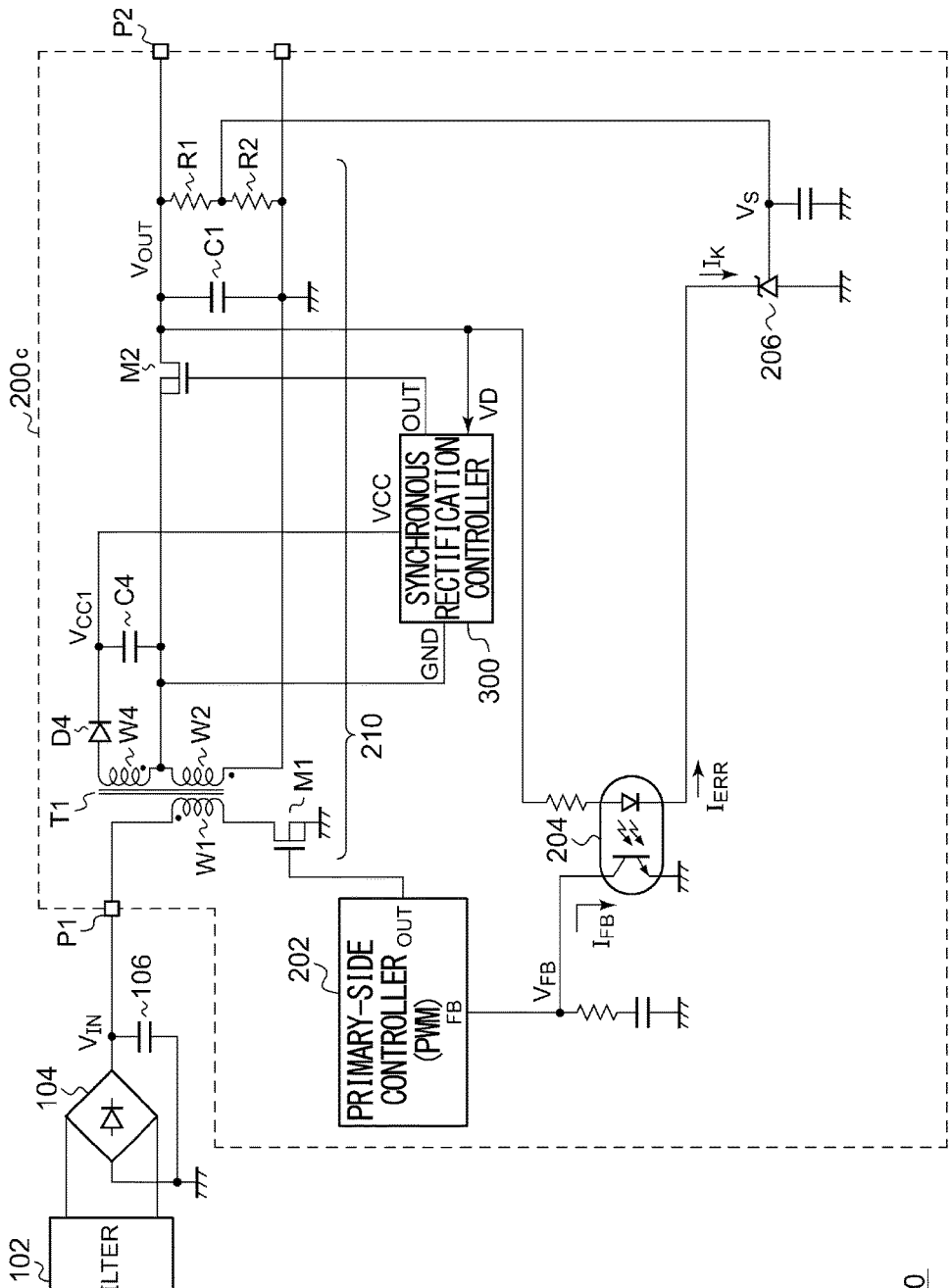
FIG. 13 is a circuit diagram showing a DC/DC converter according to a first modification.

Description has been made in the embodiment regarding an arrangement in which the synchronous rectification transistor M2 is arranged on a side where its electric potential is lower than that at the primary winding W1. Also, the synchronous rectification transistor M2 may be arranged on a side that is closer to the output terminal P2. FIG. 13 is a circuit diagram showing a DC/DC converter 200c according to a first modification.

An auxiliary winding W4 of a transformer T1, a diode D4, and a capacitor C4 form an auxiliary converter that generates a DC voltage $V_{CC1}$ that is higher than the output voltage $V_{OUT}$. The DC voltage $V_{CC1}$ is supplied to the VCC terminal. The GND terminal of the synchronous rectification controller 300 is connected to the source of the synchronous rectification transistor M2. In the first modification, the synchronous rectification controller 300 has the same configuration as that described in the embodiment. Such a modification provides the same effects as those provided by the embodiment.

[Second Modification]

Figure 14:
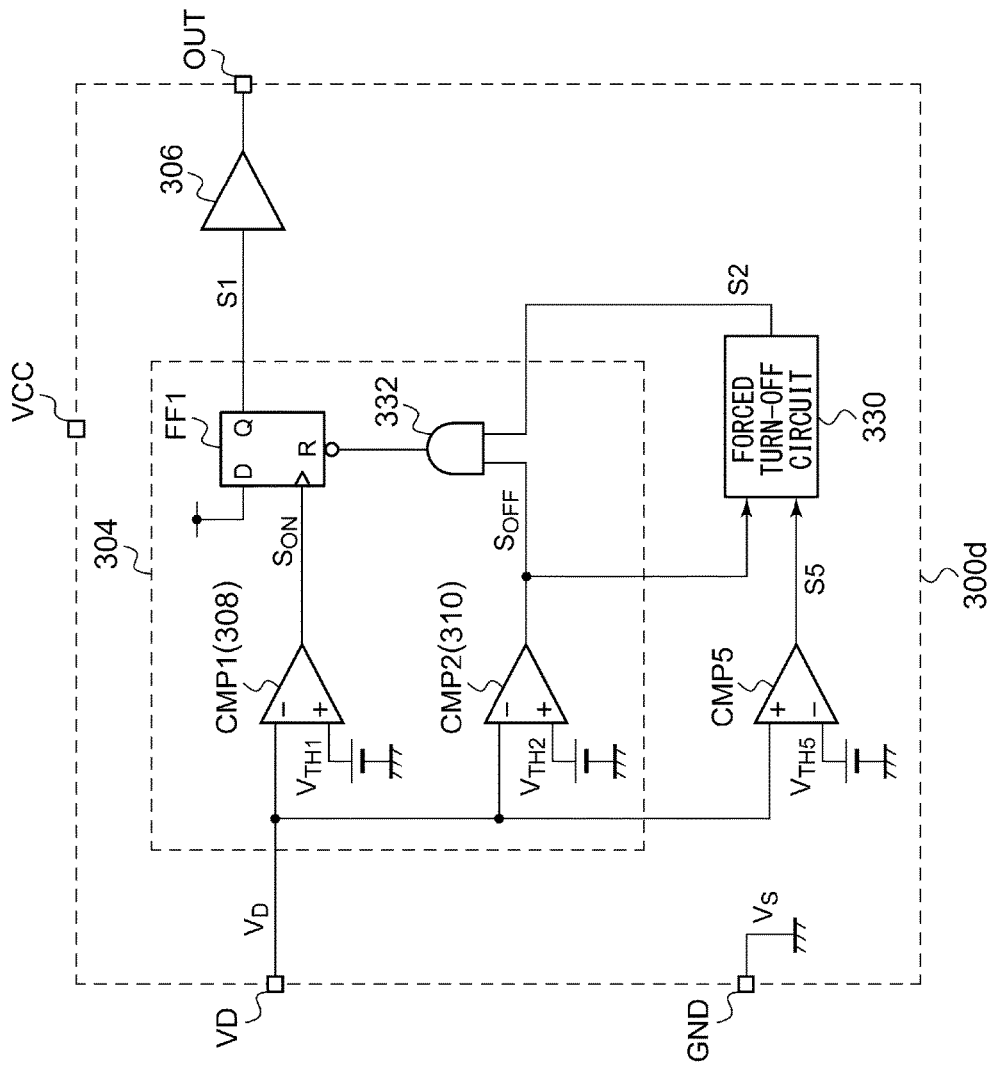
FIG. 14 is a circuit diagram showing a synchronous rectification controller according to a second modification.

FIG. 14 is a circuit diagram showing a synchronous rectification controller 300d according to a second modification. The synchronous rectification controller 300d includes a turn-on detection circuit 350 that detects whether or not the switching transistor M1 turns on. The turn-on detection circuit 350 includes a fifth comparator CMP5 that compares the voltage $V_{DS}$ across the synchronous rectification transistor M2 with a fifth threshold voltage $V_{TH5}$. When the voltage $V_{DS}$ across the synchronous rectification transistor crosses the fifth threshold voltage $V_{TH5}$, the turn-on detection circuit 350 asserts a turn-on detection signal S5 which indicates that the switching transistor M1 turns on.

The threshold voltage $V_{TH5}$ is preferably set to a voltage in the vicinity of the output voltage $V_{OUT}$ in the same manner as the third threshold voltage $V_{TH3}$. Such an arrangement is capable of detecting a rise of the drain voltage $V_D$ that occurs accompanying the turn-on of the switching transistor M1, thereby detecting whether or not the switching transistor M1 turns on. It should be noted that, in a case in which the fifth threshold voltage $V_{TH5}$ is set to the same level as that of the second threshold voltage $V_{TH2}$, the synchronous rectification controller 300d provides the same operation as that shown in FIG. 6.

[Third Modification]

Description has been made in the embodiment regarding a flyback converter. Also, the present invention is applicable to a forward converter. In this case, multiple synchronous rectification transistors are arranged on the secondary side of the transformer T1. A synchronous rectification controller may be configured to switch on and off the multiple synchronous rectification transistors. Also, such a converter may be configured as a quasi-resonant converter.

[Fourth Modification]

At least one of the switching transistor or the synchronous rectification transistor may be configured as a bipolar transistor or an IGBT.

While the preferred embodiments of the present invention have been described using specific terms, such description is for illustrative purposes only, and it is to be understood that changes and variations may be made without departing from the spirit or scope of the appended claims.

What is claimed is:

1. A synchronous rectification controller to be arranged on a secondary side of an insulated synchronous rectification DC/DC converter, and structured to control a synchronous rectification transistor, and, the synchronous rectification controller comprising:
    a drain pin coupled to a drain of the synchronous rectification transistor;
    a ground pin coupled to a source of the synchronous rectification transistor;
    a first comparator structured to compare a drain voltage at the drain pin with a first threshold voltage, and structured to assert a set signal when the drain voltage becomes lower than the first threshold voltage;
    a second comparator structured to compare the drain voltage with a second threshold voltage, and structured to assert a reset signal when the drain voltage becomes higher than the second threshold voltage;
    a forced turn-off circuit coupled to receive the reset signal second comparator, and structured to start a time measurement operation in response to an assertion of the reset signal and to assert a forced turn-off signal so as to forcibly turn off the synchronous rectification transistor after a predetermined time-up period elapses after the assertion of the reset signal;
    a flip-flop structured to generate a pulse signal which is switched to an on level in response to an assertion of the set signal, and which is switched to an off level in response to an assertion of the reset signal and an assertion of the forced turn-off signal; and
    a third comparator structured to compare the drain voltage with a third threshold voltage configured as a predetermined positive voltage,
    wherein the synchronous rectification transistor turns on in response to an assertion of the set signal and turns off in response to the assertion of the reset signal, and
    wherein, the forced turn-off circuit is coupled to receive an output signal from the third comparator, and when the drain voltage crosses the third threshold voltage, the time measurement operation of the forced turn-off circuit is reset so as to ensure a switching operation of the synchronous rectification transistor during a discontinuous mode.

2. The synchronous rectification controller according to claim 1,
    wherein, when at least one from among the reset signal and the forced turn-off signal is asserted, the flip-flop sets the pulse signal to an off level.

3. The synchronous rectification controller according to claim 1, wherein the third threshold voltage is configured as an output voltage of the DC/DC converter.

4. The synchronous rectification controller according to claim 1, wherein the forced turn-off circuit comprises:
    a capacitor having one end supplied with a fixed electric potential;
    a current source structured to supply a current to the capacitor;
    a discharge circuit structured to discharge the capacitor in response to the reset signal;
    a fourth comparator structured to compare a voltage across the capacitor with a fourth threshold voltage, and
    a one shot circuit coupled to receive an output of the fourth comparator and structured to output the forced turn-off signal which is asserted for a predetermined time period when the voltage across the capacitor exceeds the fourth threshold voltage.

5. The synchronous rectification controller according to claim 4, wherein the current source is structured to supply a current having a current value that is adjustable according to a resistance value of an external resistor externally coupled to the current source.

6. The synchronous rectification controller according to claim 1, monolithically integrated on a single semiconductor substrate.

7. An insulated synchronous rectification DC/DC converter comprising:
    a transformer comprising a primary winding and a secondary winding;
    the switching transistor connected to the primary winding of the transformer;
    the synchronous rectification transistor connected to the secondary winding of the transformer;
    a photocoupler;
    a primary-side controller that is connected to an output side of the photocoupler, and structured to switch on and off the switching transistor according to a feedback signal received from the photocoupler;
    the synchronous rectification controller according to claim 1, that controls the synchronous rectification transistor; and
    a feedback circuit that is connected to an input side of the photocoupler, and that generates an error current that corresponds to an output voltage of the DC/DC converter.

8. A power supply apparatus comprising:
    a filter structured to filter a commercial AC voltage;
    a diode rectifier circuit structured to full-wave rectify an output voltage of the filter;
    a smoothing capacitor structured to smooth an output voltage of the diode rectifier circuit so as to generate a DC input voltage; and
    the DC/DC converter according to claim 7, that steps down the DC input voltage, and that supplies the DC input voltage thus stepped down to a load.

9. An electronic device comprising:
    a load;
    a filter that filters a commercial AC voltage;
    a diode rectifier circuit that full-wave rectifies an output voltage of the filter;
    a smoothing capacitor that smooths an output voltage of the diode rectifier circuit so as to generate a DC input voltage; and the DC/DC converter according to claim 7, that steps down the DC input voltage, and that supplies the DC input voltage thus stepped down to the load.

10. A power supply adapter comprising:
a filter that filters a commercial AC voltage;
a diode rectifier circuit that full-wave rectifies an output voltage of the filter;
a smoothing capacitor that smooths an output voltage of the diode rectifier circuit so as to generate a DC input voltage; and
the DC/DC converter according to claim 7, that steps down the DC input voltage, and that supplies the DC input voltage thus stepped down to a load.

11. The synchronous rectification controller according to claim 1, wherein the third threshold voltage is essentially equal to an output voltage of the DC/DC converter.

12. The synchronous rectification controller according to claim 1, wherein the third threshold voltage is a voltage that is offset with respect to the output voltage.

13. The synchronous rectification controller according to claim 1, further comprising a setting pin to be coupled to an external resistor, wherein the time-up period is determined according to a resistance value of the external resistor.

14. The synchronous rectification controller according to claim 6, wherein the flip-flop is a D flip-flop having its D-input receiving a high level voltage, and its clock terminal receiving the set signal from the first comparator, and the synchronous rectification controller further comprises a driver having its input receiving the pulse signal output from the D flip-flop, and an output of the driver being coupled to a gate of the synchronous rectification transistor, wherein the driver is monolithically integrated on said single semiconductor substrate.

15. The synchronous rectification controller according to claim 14, wherein the second comparator having its one input coupled to the drain pin, its another input receiving the second threshold voltage, and its output coupled to a reset terminal of the D flip-flop via an AND gate.

16. The synchronous rectification controller according to claim 15, wherein an output of the third comparator is coupled to the forced turn-off circuit, and the output of the forced turn-off circuit is coupled to the reset terminal of the D flip-flop via the AND gate.

17. The synchronous rectification controller according to claim 15, wherein the drain pin and the ground pin are provided at a first side of a package of the synchronous rectification controller.

18. The synchronous rectification controller according to claim 15, wherein the drain pin and the ground pin are adjacent.

19. The synchronous rectification controller according to claim 1, wherein a forced turn-off period begins in response to an assertion of the forced turn-off signal, and the synchronous rectification transistor is kept in off-state during the forced turn-off period even when the set signal is asserted.

20. The synchronous rectification controller according to claim 2, wherein the forced turn-off period ends in response to the assertion of the reset signal.

21. The synchronous rectification controller according to claim 1, further comprising:
an output pin to be coupled to a gate of the synchronous rectification transistor, the output pin being provided at a second side of the package, the second side being parallel to the first side; and
a power supply pin to be coupled to receive a power supply voltage, and the power supply pin being provide at a third side of the package, the third side being perpendicular to the first side and the second side.

* * * * *